Nov. 4, 1952        M. MALLORY        2,616,307
CAM AND METHOD OF MAKING SAME
Filed Sept. 22, 1950        3 Sheets-Sheet 1
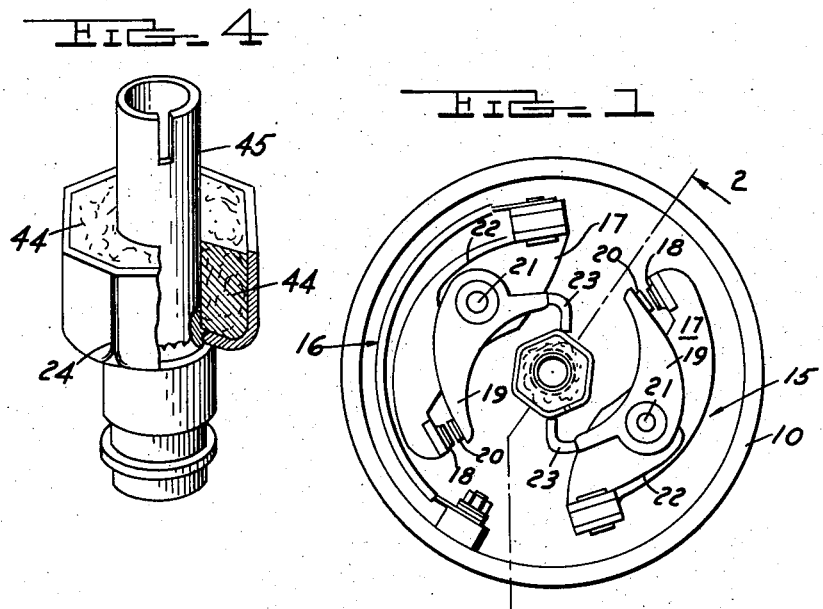
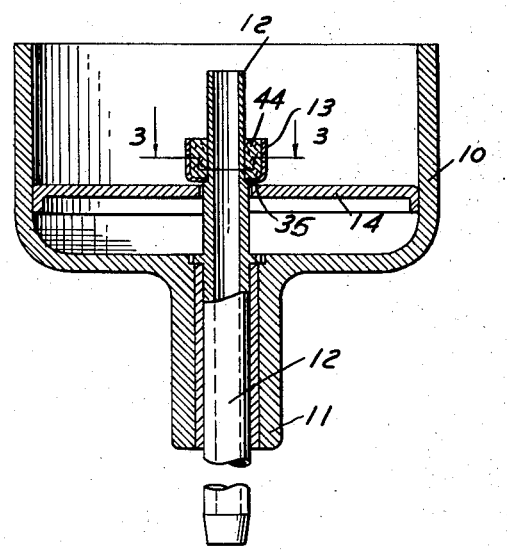
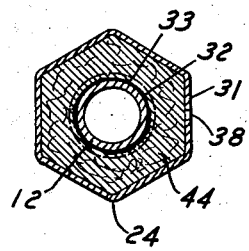
INVENTOR.
MARION MALLORY
BY Barnes, Kisselle, Laughlin & Raisch
ATTORNEYS

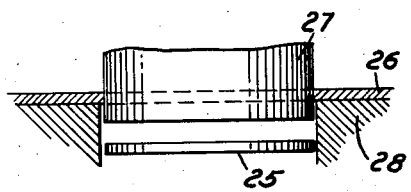
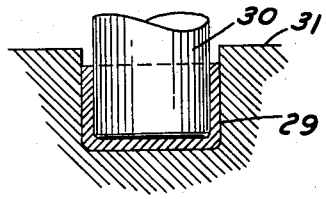
FIG. 5
FIG. 7
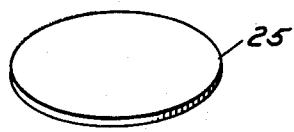
FIG. 6
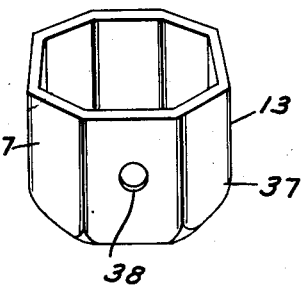
FIG. 8
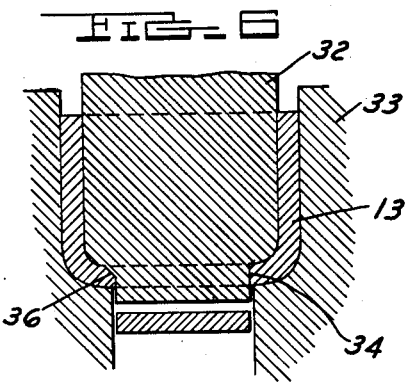
FIG. 9
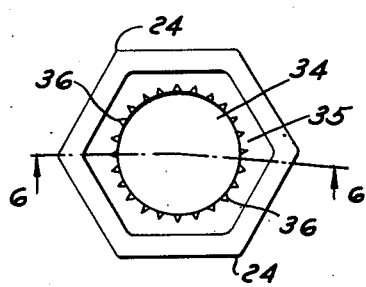
FIG. 11
FIG. 10
INVENTOR.
MARION MALLORY
BY
ATTORNEYS Nov. 4, 1952  M. MALLORY  2,616,307
CAM AND METHOD OF MAKING SAME
Filed Sept. 22, 1950  3 Sheets-Sheet 3
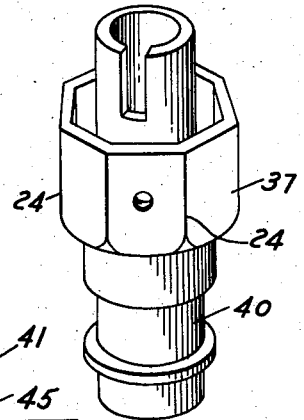
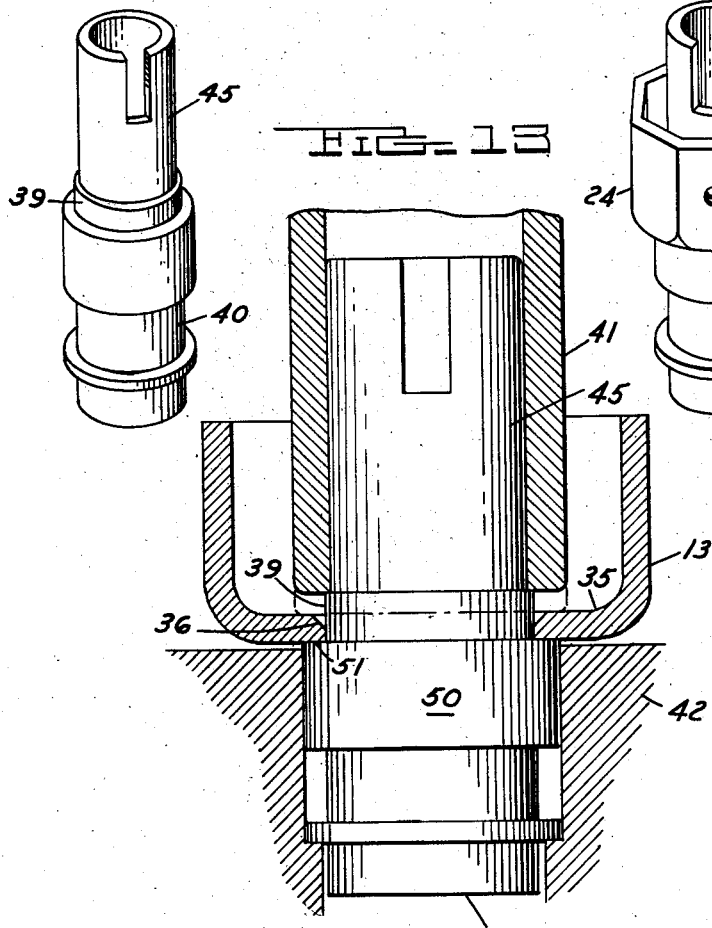
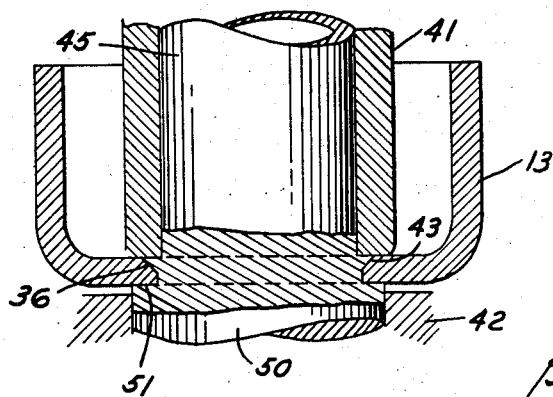
INVENTOR.
MARION MALLORY
BY
*Barnes, Kisselle, Laughlin & Raisch*
ATTORNEYS Patented Nov. 4, 1952

2,616,307

UNITED STATES PATENT OFFICE 2,616,307

CAM AND METHOD OF MAKING SAME

Marion Mallory, Detroit, Mich.

Application September 22, 1950, Serial No. 186,211

8 Claims. (Cl. 74—567)

This invention relates to a cam and method of making the same.

It is an object of this invention to produce a cam which is of economical manufacture as compared with the conventional method of machining cams from a solid bar of stock. The cam is also designed to provide an automatic lubricating arrangement for the cam follower.

In the drawings:

Fig. 1 is a top view of a timing device for an ignition system which includes the cam member of this invention.

Fig. 2 is a sectional view along the line 2—2 of Fig. 1.

Fig. 3 is a sectional view along the line 3—3 of Fig. 2.

Fig. 4 is a perspective view partly in section showing the cam member of this invention mounted on the cam sleeve.

Figs. 5 through 14 illustrate the method of making the cam of this invention.

Fig. 15 is a perspective showing the finished cam before the lubricating felt is assembled therein.

The cam, which is the subject of this invention, can be used on cam shafts or anywhere cams are required and the method of making cams, which is also the subject of this invention, can be practiced in making cams for any purpose. The instant method is very useful for making cams for ignition systems which will be referred to herein for purposes of illustration only and not by way of limitation.

Referring to the drawings, there is illustrated a timing device which includes a housing 10 having an axially extending bearing portion 11 in which is journalled a shaft 12 having a cam member 13 press fitted thereon. Shaft 12 is adapted to be connected by suitable means, not shown, with the crank shaft of an internal combustion engine.

Within housing 10 there are mounted on a plate 14 a pair of breakers 15 and 16 which time the spark produced at each of the cylinders of the engine. Each breaker comprises a fixed support 17 having a contact 18 and a movable arm 19 having a contact 20 arranged to make and break with the contact 18. Each arm 19 is pivoted on plate 14 as at 21 and is biased by a spring 22 to a position such that contacts 18 and 20 are normally together. On the side of pivot 21 opposite contact 20 each arm 19 is provided with a rubbing block 23 which is preferably formed of a hard fibrous material. A rubbing block 23 is fixed on each arm 19 and is arranged to be engaged by the humps 24 of cam 13. When the shaft 12 is rotated, each arm 19 pivots as the rubbing block 23 rides over humps 24 such that the circuit through contacts 18 and 20 (these contacts being in circuit with the spark coil of the ignition system) is alternately made and broken. The arrangement thus far described is more or less conventional, and forms no part of the present invention.

The present invention is concerned primarily with the cam 13. The first step in forming cam 13 consists of stamping a metal blank in the form of a flat circular disc 25 from a sheet 26 of any suitable metal, preferably steel, by means of a punch press comprising punch 27 and female die 28, Figs. 5 and 6. As illustrated in Figs. 7 and 8, disc 25 is next stamped or drawn into the form of a cylindrical cup 29 in a press consisting of punch 30 and female die 31. Cup 29 is next drawn or reformed into a cup shaped cam 13 having a polygonal contour in a press comprising punch 32 and female die 33, Fig. 9. Punch 32 also punches a central opening 34 in the bottom 35 of cup 13. Punch 32 also forms a plurality of preferably substantially uniformly spaced serrations 36 in bottom 35 around, and merging with, central opening 34. These serrations can extend completely through the full thickness of bottom 35 but preferably, as shown, only extend about a fraction of the distance through bottom 35. The angularly related planar faces 37 of the cam correspond in number with the number of cylinders in the engine on which the ignition timing device is to be used. A small opening 38 is next formed, either by drilling or punching, in one or more of the side walls 37 of the cam 13.

The polygonal cam 13 is now hardened by suitable and known heat treating methods and then positioned over circumferential shoulder 39 on sleeve or shaft 40. The diameter of circular central opening 34 preferably, but not necessarily, is slightly less than the diameter of shoulder 39 on spindle 40 so that cup 13 may be press fitted on the spindle. After cup 13 is slipped or fitted over shoulder 39, then punch 41 moves downwardly toward die member 42 and upsets the portion of shoulder 39 above the bottom 35 of cup 13 into serrations 36 as shown at 43, Fig. 14. This upsetting of shoulder 39 into serrations 36 effectively fixes cam 13 on to sleeve 40 regardless of whether the sleeve 13 is initially press or force fitted or simply fitted over shoulder 39. It will be noted in Fig. 13 that shoulder 39, prior to being upset into serrations 36, projects or extends above the bottom 35 of the cup 13.

The faces 37 of the cam are now ground to size. Only a very small amount of metal needs to be ground off of the faces 37 of the cam because the final pressing operation, Figs. 9, 10 and 11, forms the cam 13 and its planar faces 37 to within a very few thousandths of an inch of their finished size.

It will be noted that sleeve 40 is provided with a shoulder 50 against which the bottom 35 of cam 13 seats as at 51. Thus, the metal 43 from shoulder 39 which is upset into serrations 36 cooperates with shoulder 50 to positively lock cam 13 against axial movement relative to sleeve 40.

The punching of disc 25, Fig. 5, and the pressing of the disc 25 into cup 29, Figs. 7 and 8, can be formed simultaneously by means of a composite die, if desired.

The side walls 37 of cam 13 are fashioned such that the cam in horizontal section, Figs. 3, 10, has a contour corresponding to a regular polygon, the side walls intersecting to provide a plurality of regularly spaced humps 24 around the periphery of the cam.

Cam 13 is preferably blanked from sheet steel capable of being hardened by heat treatment and the cupped cam is subjected to a suitable hardening treatment prior to its assembly with shaft 12 or spindle 40. Cam 13 is mounted on shaft 12 (Fig. 2) in the same manner as cam 13 is mounted on shaft 40 as described above.

Cam 13 can be used anywhere cams are required and can be lubricated by conventional methods. However, if desired, the present cams can be lubricated by a novel arrangement as follows: After the cam is hardened and assembled on shaft 12 or spindle 40, a suitable fibrous material 44, such as felt which is saturated with a lubricant such as oil, is inserted within the receptacle provided between the side walls 37 of the cam and the outer surface of the reduced portion 45 of sleeve 40. In operation the oil with which the felt 44 is saturated seeps out through the hole or holes 38 and lubricates the outer faces of the side walls 37 which are contacted by the rubbing blocks 23 thus reducing wear on the blocks.

If desired, other arrangements for securing cam 13 upon its supporting shaft can be provided. For example, cam 13 may be press or shrink fitted upon its supporting shaft. When cam 13 is press fitted upon its supporting shaft, then preferably central opening 34 will be of polygonal contour and the portion of the shaft to which cam 13 is fitted will have a corresponding contour. If desired, cam 13 can be secured to its supporting shaft by fusion welding at the junction between central opening 34 and the supporting shaft.

I claim:

1. In a device of the type including a support and an upright shaft rotatably supported by the support, the combination of a cup-shaped sheet metal cam member having an open upper end and a bottom wall at the lower end thereof, said cam member having a plurality of angularly related side walls extending upwardly from said bottom wall and intersecting to form a plurality of cam portions around the periphery of said cam member, said bottom wall having a central opening therein, said shaft projecting upwardly through said central opening, the portion of said bottom wall surrounding said opening having a fixed connection with said shaft, said bottom wall and said side walls of said cam member cooperating with the portion of said shaft projecting upwardly through said bottom wall to form a receptacle, and a fibrous material within said receptacle saturated with lubricant.

2. The combination claimed in claim 1 wherein at least one of said side walls is provided with an opening therein through which said lubricant is dischargeable.

3. In combination, a shaft, a cup-shaped sheet metal cam member open at one end and having a bottom wall at its other end, said cam member also having a plurality of angularly related side walls intersecting to form a plurality of cam portions around the periphery of said cam member, said bottom wall having a central opening therein, said shaft projecting through said central opening and having a shoulder thereon upon which said bottom wall is seated, the portion of the metal of said shaft adjacent and on the opposite side of said bottom wall with respect to said shoulder being upset to overlie the portion of said bottom wall surrounding said opening and cooperating with said shoulder to lock the cam against axial movement on said shaft.

4. The combination claimed in claim 3 wherein said central opening is serrated.

5. The combination claimed in claim 4 wherein said serrations are angularly inclined relative to the plane of said bottom wall and form a generally conically shaped wall defining said central opening, said upset metal portion of said shaft engaging said serrations.

6. The method of making a cam shaft which comprises forming a flat disk into a cup-shaped cam member having a plurality of angularly related side walls and a bottom wall, forming a central opening in said bottom wall, forming on a shaft three adjacently positioned portions of increasing transverse dimension, each separated from the other by a shoulder, the intermediate of said portions being cylindrical in shape and having a diameter corresponding to the diameter of said central opening, the portion of said shaft adjacent one side of said intermediate portion having a diameter smaller than said central opening and said other portion of said shaft having a diameter greater than said central opening, positioning said cam member on said shaft such that the bottom wall of said cam member is seated upon the shoulder between said intermediate portion and said portion of larger diameter and thereafter upsetting said intermediate portion of said shaft to displace the metal therein against said bottom wall and thereby fixedly assemble said cam member on said shaft.

7. The method defined in claim 6 including the step of forming serrations around the edge of said central opening.

8. The method defined in claim 6 including the step of forming around the edge of said central opening serrations which are angularly inclined relative to the plane of said bottom wall.

MARION MALLORY.

REFERENCES CITED

The following references are of record in the file of this patent:

UNITED STATES PATENTS

| Number | Name | Date |
|---|---|---|
| 935,660 | Johnson | Oct. 5, 1909 |
| 1,129,989 | Kelsey | Mar. 2, 1915 |
| 1,150,249 | Carlson | Aug. 17, 1915 |
| 1,157,666 | Bennett | Oct. 26, 1915 |
| 1,390,949 | Yassenoff | Sept. 13, 1921 |
| 1,624,113 | Norviel | Apr. 12, 1927 |
| 1,634,737 | Chryst et al. | July 5, 1927 |
| 1,984,718 | Wistrand | Dec. 18, 1934 |